US008650187B2

(12) United States Patent
Chen et al.

(10) Patent No.: US 8,650,187 B2
(45) Date of Patent: *Feb. 11, 2014

(54) SYSTEMS AND METHODS FOR LINKED EVENT DETECTION

(75) Inventors: Francine R. Chen, Menlo Park, CA (US); Ayman O. Farahat, San Francisco, CA (US); Thorsten H. Brants, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1926 days.

This patent is subject to a terminal disclaimer.

(21) Appl. No.: 10/626,875

(22) Filed: Jul. 25, 2003

(65) Prior Publication Data

US 2005/0021490 A1    Jan. 27, 2005

(51) Int. Cl.
*G06F 7/00*    (2006.01)
*G06F 17/30*    (2006.01)

(52) U.S. Cl.
USPC ............................................... 707/726

(58) Field of Classification Search
USPC ............................. 707/1; 704/239
See application file for complete search history.

(56) References Cited

U.S. PATENT DOCUMENTS

| | | | | |
|---|---|---|---|---|
| 5,835,905 | A * | 11/1998 | Pirolli et al. ................... 707/3 |
| 6,012,073 | A * | 1/2000 | Arend et al. ................ 715/526 |
| 6,131,089 | A | 10/2000 | Campbell et al. |
| 6,192,360 | B1 | 2/2001 | Dumais et al. |
| 6,411,962 | B1 | 6/2002 | Kupiec |
| 6,584,220 | B2 | 6/2003 | Lantrip et al. |
| 6,606,620 | B1 * | 8/2003 | Sundaresan et al. ............ 707/3 |
| 6,961,954 | B1 * | 11/2005 | Maybury et al. ............. 725/53 |
| 7,085,755 | B2 | 8/2006 | Bluhm et al. |
| 7,099,505 | B2 | 8/2006 | Li et al. |
| 2002/0059602 | A1 * | 5/2002 | Macrae et al. ................ 725/42 |
| 2003/0182631 | A1 | 9/2003 | Tsochantaridis et al. |

(Continued)

OTHER PUBLICATIONS

Ralf D. Brown, "Dynamic Stopwording for Story Link Detection", Language Technologies Institute Carnegie Mellon University, Proceedings of the HLT 2002: Second Conference on Human Language Technology Research, San Diego, CA Mar. 25, 2002.*

(Continued)

*Primary Examiner* — Jeffrey A Burke
(74) *Attorney, Agent, or Firm* — Fay Sharpe LLP

(57) ABSTRACT

Techniques for training and using linked event detection systems and transforming source-identified stopwords are provided. A training corpus of source identified stories and a reference language is determined. Optionally, stopwords for source-identified stories are transformed based on statistical analysis of parallel verified and un-verified transformations. Reference language and non-reference language terms are selectively included in source-pair term frequency-inverse story frequency models. Optionally, incremental source-identified term frequency-inverse story frequency models are determined. Selected terms are weighted and similarity metrics determined. Associated source-pair statistics, computed in part from a training corpus, are combined with the values of each similarity metric in the set of similarity metrics to form a similarity vector. Similarity vectors and verified link label information are used to determine a predictive model. Similarity vectors for story pairs are used with the predictive model to determine if the story-pairs are linked. Sources are arranged based on source inter-relationships into a source-hierarchy. Progressively more refined source-pair similarity statistics are also provided. New sources and associated source-pair similarity statistics are added by substituting related source-pair similarity statistics based on the source hierarchy and source characteristics. The source-pair similarity statistics are used to optionally normalize the similarity metrics.

88 Claims, 9 Drawing Sheets

(56) References Cited

U.S. PATENT DOCUMENTS

| | | | |
|---|---|---|---|
| 2004/0002849 A1* | 1/2004 | Zhou | 704/4 |
| 2004/0006559 A1* | 1/2004 | Gange et al. | 707/3 |
| 2005/0021324 A1 | 1/2005 | Brants et al. | |
| 2005/0289463 A1* | 12/2005 | Wu et al. | 715/533 |
| 2006/0062451 A1 | 3/2006 | Li et al. | |

OTHER PUBLICATIONS

Charles Wayne, Topic Detection and Tracking in English and Chinese, Department of Defense, 2002.*

Alexander Hauptmann, Danny lee and Paul E. Kennedy, Topic Labeling of Multilingual Broadcast news in the Informedia Digital Video Library, Jun. 1999.*

Christopher Cieri, David Graff, Mark Liberman, Nii Martey and Stephanie Strassel, Large, Multilingual, Broadcast News Copora for Cooperative Research in Topic Detection and Tracking, 2001.*

R, Brown, "Dynamic Stopwording for Story Link Detection", Proceedings of the HLT 2002: Second International Conference on Human Language Technology Research, San Diego, CA Mar. 24-27, 2002.

Allan, J. et al., "Detection, Bounds, and Timelines: UMass and TDT-3" in Proceedings of Topic Detection and Tracking Workshop (TDT-3), Vienna, Virginia, Feb. 2000.

Allan, J. et al., "On-line new event detection and tracking" in Proceedings of SIGIR-98, Melbourne, Australia, 1998, p. 37-45.

Allan, J., et al., "Topic-based novelty detection", Summer Workshop Final Report, Center for Language and Speech Processing, John Hopkins University, 1999.

Franz, M., et al., "First Story Detection: Combining similarity and novelty-based approaches", Slides at the TDT-2001 meeting, IBM, 2001.

Brants, T., et al., "Topic-based document segmentation with probabalistic latent semantic analysis", in International Conference on Information and Knowledge Management (CIKM), McLean, VA 2002.

Croft, W.B., et al., "Relevance feedback and personalization: A language modelling perspective" in DELOS Workshop: Personalisation and Recommender Systems in Digital Libraries, 2001.

Dunning, T.E., "Accurate Methods for the statistics of surprise and coincidence" in Computational Linguistics 19(1):61-74, 1993.

Hearst, M.A., "TextTiling: Segmenting text into multi-paragraph subtopic passages", in Computational Linguistics, 23(1):33-64, 1997.

Joachims, T., "Making large-scale svm learning practical", in Advances in Kernel-Methods Support Vector Learning, B. Schlkopf, C. Burges, A. Smola eds., MIT Press, 1999.

Joachims, T., "Text categorization with support vector machines: learning with many relevant features" in Proceedings of the 10th European Conference on Machine Learning, 1998, pp. 137-142.

Lavrenko, V., et al., "Relevance models for topic detection and tracking", in Proceedings of the HLT-2002, San Diego, CA 2002.

Schapire, R. E., et al., Boostexter: A boosting-based system for text categorization, in Machine Learning, 2000.

Yang, Y., et al., "A study on retrospective and on-line event detection", in Proceedings of SIGIR-98, Melbourne, Australia, 1998.

Yang, Y., et al., "Topic-conditioned novelty detection" in Proceedings of the International Conference on Knowledge Discovery and Data Mining, Edmonton, Canada, 2002.

Zhang, Y., et al., "Novelty and redundancy detection in adaptive filtering" in Proceedings of SIGIR-02, Tampere, Finland, 2002, pp. 81-88.

R.O. Duda, P.E. Hart and D.G. Stark, Pattern Classification, Second Edition, Jon Wiley & Sons Inc. New York, 2001, p. 630-633.

Allan et al.; Topic Detection and Tracking Pilot Study Final Report Date 1998; DARPA; Website: https://www.itl.nist.iaui/894.01/publications/darpa98/pdf/tdt2040.pdf.

Interim Guidelines for Examination of Patent Applications for Patent Subject Matter Eligibility; Annex IV; pp. 50-67; Publication Date: Nov. 22, 2005.

* cited by examiner

| STORY ID1 | STORY ID2 | HELLINGER | TANIMOTO | CLARITY | COSINE | SOURCE-PAIR-MEAN-COSINE | SOURCE-PAIR-MEDIAN-COSINE | SOURCE-PAIR-VARIANCE-COSINE | RUNNING-MEAN-COSINE | RUNNING-MEDIAN-COSINE |
|---|---|---|---|---|---|---|---|---|---|---|
| 1000 | 1000 | .25 | .21 | .26 | .25 | .25 | .31 | .01 | .25 | .27 |
| 1000 | 1002 | .26 | .20 | .25 | .24 | .22 | .35 | .03 | . | . |
| 1001 | 1002 | .24 | .20 | .26 | .25 | .23 | .32 | .02 | . | . |
| . | . | . | . | . | . | . | . | . | . | . |
| . | . | . | . | . | . | . | . | . | . | . |
| 596 | 621 | .25 | .21 | .30 | .28 | .26 | .31 | .02 | . | . |

| STORY ID1 | STORY ID2 | LINK LABEL |
|---|---|---|
| 1000 | 1001 | 1.0 |
| 1000 | 761 | 1.0 |
| . | . | . |
| . | . | . |
| . | . | . |
| 596 | 621 | .25 |

FIG. 8

| | ASR:ASR | ASR:TEXT | TEXT:TEXT |
|---|---|---|---|
| ENGLISH:ENGLISH | a | b | c |
| ENGLISH:ARABIC | - | m | n |
| ENGLISH:MANDARIN | o | - | - |
| ARABIC:ARABIC | - | - | p |
| ARABIC:MANDARIN | - | q | r |
| MANDARIN:MANDARIN | s | t | u |

FIG. 9

| | ASR:ASR | ASR:TEXT | TEXT:TEXT |
|---|---|---|---|
| ENGLISH:ENGLISH | a | b | c |
| ENGLISH:NON-ENGLISH | d | e | f |
| NON-ENGLISH:NON-ENGLISH | g | h | i |

FIG. 10

SYSTEMS AND METHODS FOR LINKED EVENT DETECTION

INCORPORATION BY REFERENCE

This Application incorporates by reference:
entitled "SYSTEMS AND METHODS FOR DETERMINING THE TOPIC STRUCTURE OF A PORTION OF TEXT" by I. Tsochantaridis et al., filed Mar. 22, 2002 as U.S. patent application Ser. No. 10/103,053;
entitled "SYSTEMS AND METHODS FOR NEW EVENT DETECTION" by F. Chen et al., filed Jul. 25, 2003, as U.S. patent application Ser. No. 10/626,856; each, in their entirety.

BACKGROUND OF THE INVENTION

1. Field of Invention

This invention relates to the detection of linked events.

2. Description of Related Art

Link detection systems determine whether stories in news and radio broadcasts, newspaper articles and journal reports are about the same event. Link detection systems differ from conventional categorization systems in that the events to be detected occur frequently but may not have been seen before. Thus, effective link detection systems must devise strategies for learning from new input or must determine ways of characterising the input independent of the particular event.

Conventional link detection systems have attempted to improve link detection by refining or developing new similarity metrics such as the weighted sum, language modeling, Kullback-Leibler and cosine similarity metrics. Other conventional systems have refined the application of conventional term frequency-inverse document frequency models. For example, some conventional link detection systems continuously adapt and apply models based on source-pair classes. Some other conventional link detection systems have attempted to improve detection results using source-specific similarity thresholds and two level schema for topic conditioned first story detection. Still other conventional link detection systems have attempted to improve link detection performance by training support vector machines with term frequency-inverse document frequency information. However, these systems have not performed well.

SUMMARY OF THE INVENTION

The systems and methods according to this invention provide for linked event detection, determining source-based stopwords and source-based term-frequency-inverse story frequency and incremental source-based term-frequency-inverse story frequency determination. The systems and methods of this invention also provide for determining story link detection systems using inter-story similarity metrics, source-pair statistics and link label information. Hierarchical categorization of sources and adaptable selection of source-pair normalization statistics for new sources is also provided.

BRIEF DESCRIPTION OF THE DRAWINGS

FIG. 7 is an exemplary data structure for storing similarity vectors according to this invention;

FIG. 8 is an exemplary data structure for storing link label information according to this invention;

FIG. 9 is an exemplary data structure for storing fine-grained source-identified statistical information according to an exemplary embodiment of this invention;

FIG. 10 is an exemplary data structure for storing course-grained source-identified statistical information according to an exemplary embodiment of this invention;

DETAILED DESCRIPTION OF EXEMPLARY EMBODIMENTS

Figure 1:
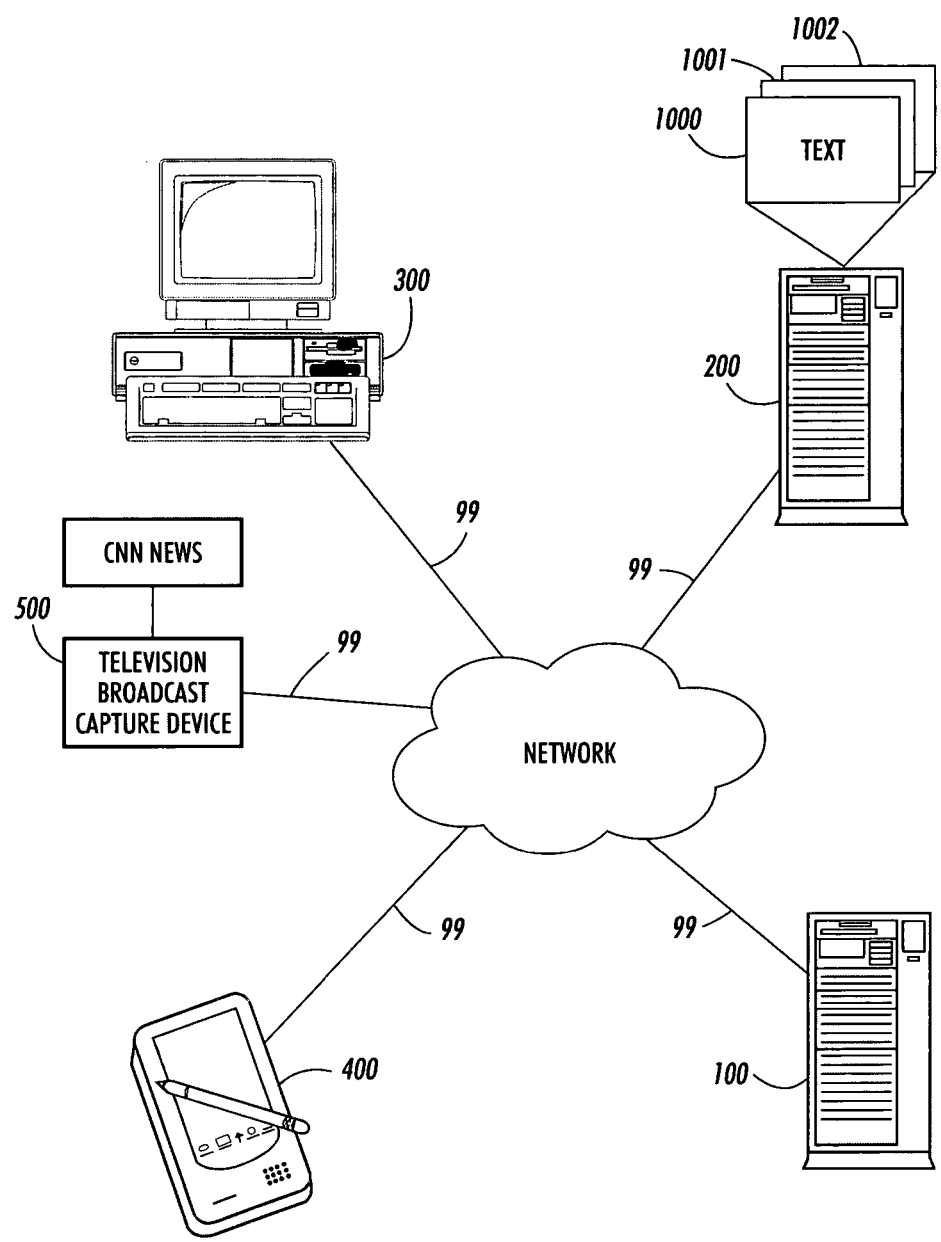
FIG. 1 is an overview of an exemplary linked event detection system according to this invention.

FIG. 1 is an overview of an exemplary link detection system 100 according to this invention. The link detection system 100, a personal computer 300, a web-enabled tablet computer 400, a television broadcast capture device 500 and an information repository 200 containing texts 1000-1002 are connectable via communications link 99.

In one of the various exemplary embodiments according to this invention, a user of the personal computer 300 initiates a request to determine a predictive model for the link detection system 100 using training. The request is forwarded via communications links 99 to the link detection system 100. The link detection system 100 retrieves a source-identified training corpus such as source-identified stories 1000-1001 and associated link label information from information repository 200 over communications link 99. In various other exemplary embodiments according to this invention, the link detection system 100 may form a part of a stand-alone personal computer or may be located at any point accessible via communications link 99. Moreover, the corpus of training stories may be stored locally on disk, CD-ROM and/or may be placed at any location accessible via communications links 99.

The link detection system 100 may perform pre-processing of the training stories, such as word stemming. For example, stopwords may be removed based on the identified source and the story terms determined. In various exemplary embodiments according to this invention, the terms are incorporated directly into source-identified term-frequency-inverse document frequency models. Terms for sets of stories may be accumulated and incorporated into incremental term frequency-inverse document frequency models at specific update frequencies. For example, in one exemplary embodiment, updates occur every two hours or every thirty stories, whichever occurs first. However, it will be apparent that any update frequency based on any combination of time periods, the number of stories encountered and/or other criteria may also be used.

The term frequency-inverse story frequency models reflect the counts of terms found in each story. Each story is assigned a unique story identifier to differentiate multiple stories appearing in a single document.

One or more inter-story similarity metrics for each pair of stories is determined. Optionally source-pair similarity statistics for each pair of stories are also determined and used to normalize the one or more inter-story similarity metrics. The one or more inter-story similarity metrics and the optionally normalized source-pair similarity statistics are combined to form a similarity vector for each pair of stories or story pair. The similarity vector and the link label information associated with the story pair are used to determine a predictive model for the link detection system 100. The predictive model may be determined by training a machine learner or any other method of determining a predictive model. The predictive model is then deployed and/or saved.

In another of the various exemplary embodiments according to this invention, a user of an input device such as web-enabled tablet computer 400 initiates a link detection request between the new source-identified story 1002 and source-identified stories 1000-1001 over communications link 99. The link detection system 100 receives the link detection request, the previously determined predictive model and the source-identified stories 1000-1002. The terms contained in the new source-identified story 1002 are determined. The incremental source-identified term frequency-inverse story frequency models are then updated with terms from the new story 1002. Inter-story similarity metrics for each pair of stories are determined for the new story 1002 and each of the stories 1000-1001. Thus, inter-story similarity metrics for story-pairs 1000-1001, 1000-1002 and 1001-1002 are determined. In one exemplary embodiment according to this invention, the source-pair similarity statistics are then updated. A link between the stories is then predicted based on the predictive model and the similarity vector. A link prediction and an optional confidence score is then returned to the user of web-enabled tablet computer 400 over communications link 99.

In various other exemplary embodiments according to this invention, a new story may be captured from the television broadcast capture device 500 using an automatic speech recognizer (not shown), or any other known or later developed method of capturing or entering story information.

For example, the CNN news story, "Breaking NEWS, a severe tornado hits the Raleigh, N.C. area today" is captured by the television broadcast capture device 500 and the associated speech utterances are automatically recognized. The automatically recognized speech story or transcription is then forwarded to the information repository 200 with source-identifying information. The automatically recognized speech story is then compared to previously encountered stories to identify story links. Statistical normalizations and transformations are applied to the terms of the automatically recognized speech story and the values of the inter-story similarity metrics based on the source information. For example, since the CNN news story was captured using automatic speech recognition, the terms in the text recognized from the speech utterance may differ from the terms obtained from a textual source. Source-pair information is used to refine the normalization of the inter-story similarity metrics based on each specific combination of stories. A prediction of whether the automatically recognized speech story is linked to previously encountered stories is then determined by the link detection system 100.

Figure 2:
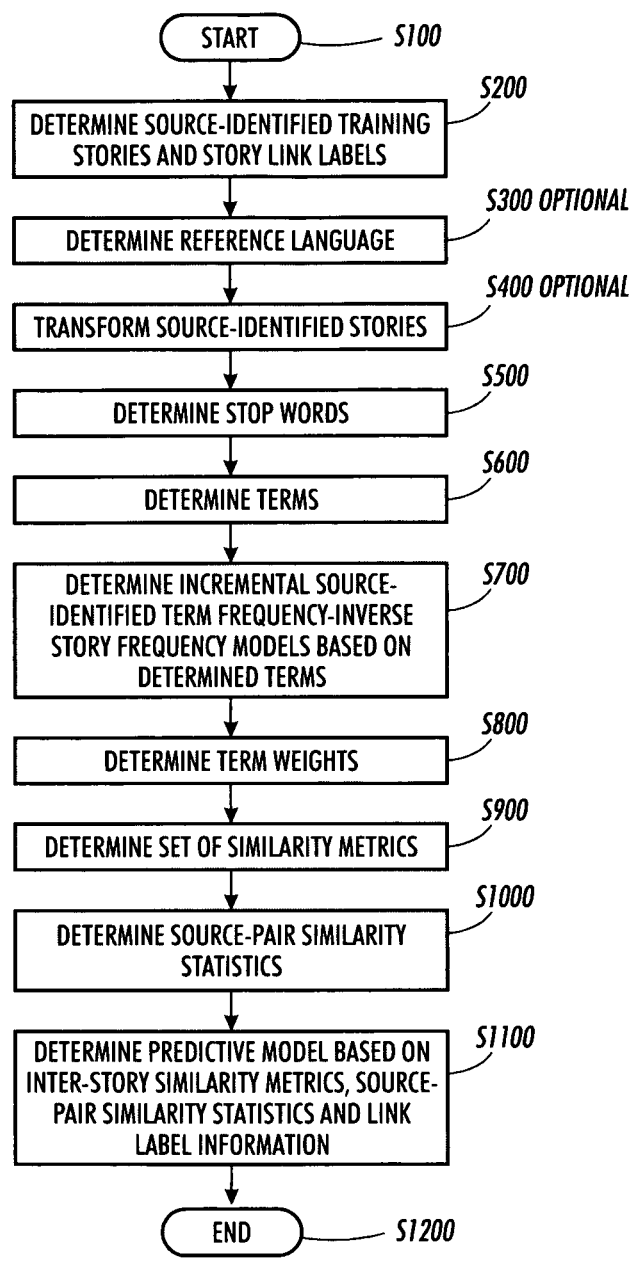
FIG. 2 is a flowchart of an exemplary method for determining a predictive model for a linked event detection system according to this invention.

FIG. 2 is a flowchart of an exemplary method for determining a predictive model for a linked event detection system according to this invention. The process begins at step S100 and immediately continues to step S200.

In step S200, source-identified training stories and associated story link label information are determined. In various exemplary embodiments according to this invention, a training corpus of stories and associated link label information is determined. The link label information indicates whether two stories are about the same event. Each entry in the link label information indicates the existence of a link between a pair of stories in the training corpus. For discussion purposes, each story is associated with one document. However, it will be apparent that in various other exemplary embodiments according to this invention, a single document may contain one or more stories, and each story may contain one or more events. Each story in the training corpus is labeled with a story identifier. After determining the training corpus and the link label information, control continues to optional step S300.

A reference language is determined in optional step S300. The reference language may be selected by the user through a dialog box, a pop-up window, determined automatically based on user information, retrieved from an information store or determined using any known or later developed method. The reference language may be selected to reflect the language of the user or an interlingual language for which translation tools exist. The input language is the original input language of the story and current language is the language the story has been translated to, if different from the input language. For example, a user may select "English" as the reference language by selecting the language from a list of languages displayed in a selection list using a mouse, speech input or other device. In various other exemplary embodiments according to this invention, the reference language is initially determined at startup and then used for each successive story in a search. After the reference language is determined, control continues to optional step S400.

In optional step S400, a transformation is applied to stories in the training corpus. Transformations may include transcribing a source from speech utterances to text, translating non-reference language stories in the training corpus to the reference language or performing any known or later developed transformation or combination of transformations. For example, if English is selected as the reference language, non-English language stories in the training corpus are automatically or manually translated into English. After the stories are transformed, control continues to step S500.

Stopwords in the selected source-identified story are determined and removed in step S500. In various exemplary embodiments, stopwords may be removed based on multiple stopword lists. A first stopword list includes frequently occurring words such as "and", "a", "the" and other high frequency words that add little meaning. A second stopword list is determined based on the source-identity information.

For example, the speech utterance "one hundred and twenty three" is typically used when discussing the text value "123". Therefore, if the story is captured using automatic speech recognition, the terms "one", "hundred", "and", "twenty", "three" are included. However, if the same story is captured from an optical character recognition of the speaker's text notes, the term "123" would be included. These systematic source-pair transformation differences may occur due to specific language pair translation errors, transcription errors and the like. Problematic systematic source-pair transformation differences are determined based on the parallel comparison of verified and unverified transformations of a training corpus. The problematic systematic source-identified transformation differences are added to the source-identified second stopword list.

A verified transformation is a transformation that has been checked for accuracy. For example, the transformation may be performed manually several times and a certain result agreed as correct. In various exemplary embodiments, a standard parallel translation corpus such as United Nations Reports, Hansard's Parliamentary Reports, and the like are used to determine a verified translation. An un-verified translation is determined by applying the translation process to each of the un-transformed texts in the corpus. The differences between the verified translation and the un-verified translation reflect errors induced by the translation and/or transformation process. It will be apparent that in various other exemplary embodiments according to this invention, any known or later developed method of determining a verified transformation and/or any other method of determining systematic errors induced by the transformation process may be used in the practice of this invention.

High frequency problematic word transformations are then selected and added to the source-identified stopword list. Candidate terms in the selected story that match words in the stopword lists are discarded and/or removed. After the stopwords are discarded and/or removed, control continues to step S600.

In step S600, all terms except stopwords and terms having low story counts, are selected for the source-identified term frequency-inverse story frequency models or incremental source-identified term frequency-inverse story frequency models. Selected terms include, but are not limited to non-stopwords and un-translated or non-reference language terms.

For example, due to translation limitations, a complete translation of all terms in a story may not be possible. That is, some terms and/or context information associated with the term may be difficult or impossible to translate. Automatic translation systems or human translators may leave terms un-translated, tagged with HTML, XML tags, left in original encoding such as Unicode, ASCII and the like, or otherwise indicated. The source-identified term frequency-inverse story frequency models and incremental source-identified term frequency-inverse story frequency models of this invention allow the importance of un-translated terms to be weighted within source-identified groupings. Therefore, the significance of these un-translated terms may be used to further differentiate stories. After translated and un-translated terms are selected, control continues to step S700.

In step S700, a source-identified term frequency-inverse story frequency model or incremental source-identified term frequency-inverse story frequency model is created. A term frequency-inverse story frequency analysis may be performed incrementally for each identified source. For example, term frequency-inverse story frequency models are associated with source characteristics such as "English:Text", "Mandarin:ASR" and "French:ASR".

In various exemplary embodiments of this invention, incremental source-identified term frequency-inverse story frequency models may be used. The models are initialized and updated as new sets of stories are received. For example, the incremental source-identified incremental term frequency-inverse story frequency models may be initialized based on source-identified analysis of the training corpus, default values or any known or later developed method of initialization. The initialized incremental source-identified incremental term frequency-inverse story frequency models are then updated. It will be apparent that the updates may occur continuously as each new story is received, incrementally with each set of $C_k$ stories encountered so far, based on an interval and/or any known or later developed update frequency or combination of update frequencies without departing from the scope of this invention.

As each new set of stories is analyzed, new vectors associated with the new terms are added to the incremental source-identified incremental term frequency-inverse story frequency models. In various exemplary embodiments according to this invention, incremental source-identified term frequency-inverse story frequency models are updated determined based on the formula:

$$df_k(t) = df_{k-1}(t) + df_{C_k}(t) \quad (1)$$

where $df_{C_k}(t)$ is the number of stories in which term t occurs in the newly added set of stories $C_k$ and $df_k(t)$ is the number of stories in which term t occurs, after adding the set of stories $C_k$. The initial story counts $df_0(t)$ can be initialized from an empty training set, initialized based on historical information or any other known or later developed initialization method. An optional threshold value is set so that terms having story frequencies below the threshold value are removed from immediate consideration but may be kept for update with the next set of stories $C_{k+1}$. Control then continues to step S800.

The term weights of the selected terms t in story d are determined in step S800. In various exemplary embodiments according to this invention, term weights are determined based on the formula:

$$w_k(d, t) = \frac{1}{Z_k(d)} f(d, t) \cdot \log \frac{N_k}{df_k(t)} \quad (2)$$

where $N_k$ is the total number of stories in set k and where $Z_k(d)$ is a normalization value.

The normalization value $Z_k(d)$ for the probabilistic metrics such as the Hellinger, Tanimoto and clarity metrics, are determined based on the formula:

$$Z_k(d) = \sum_t f(d, t) \cdot \log \frac{N_k}{df_k(t)} \quad (3)$$

Similarly, normalization values $Z_k(d)$ for the Euclidean metrics such as the cosine distance are determined based on the formula:

$$Z_k(d) = \sqrt{\sum_t \left[ f(d, t) \cdot \log \frac{N_k}{df_k(t)} \right]^2} \quad (4)$$

After the term weights are determined, control then continues to step S900.

In step S900, values for the set of similarity metrics are determined for story-pairs in the corpus of training stories. A set of similarity metrics for a first and second story-pair are associated with one or more similarity metrics. Similarity metrics are measures of the similarity between a first and second story. Some examples of similarity metrics include the Hellinger metric, the Tanimoto metric, the clarity metric and the cosine-distance similarity metric. However, it will be apparent that any probabilistic, Euclidean or any other known or later developed similarity metric may also be used without departing from the spirit or scope of this invention.

The cosine-distance similarity metric describes the degree of similarity between stories $d_1$ and $d_2$. In various exemplary embodiments according to this invention, the cosine-distance similarity metric is determined based on the formula:

$$\text{similarity}(d_1, d_2) = \sum_t w(d_1, t) \cdot w(d_2, t) \quad (5)$$

where t ranges over the terms that occur in stories $d_1$ and $d_2$.

In various other exemplary embodiments, similarity metrics such as the cosine-distance similarity metric are optionally normalized based on source-pair information to further refine or adjust the story link determination. For example, the cosine-distance metric may be normalized by subtracting the running median of source-pair cosine similarity values from the cosine source-pair similarity metric. However, any normalization based on source information may be used without departing from the scope of this invention.

The Hellinger distance similarity metric is associated with the distance between word distributions for stories $d_1$ and $d_2$. In various exemplary embodiments according to this invention, the Hellinger distance similarity metric may be determined based on the formula:

$$\text{similarity}(d_1, d_2) = \sum_t \sqrt{w(d_1, t) \cdot w(d_2, t)} \quad (6)$$

The Hellinger similarity metric may also be normalized based on the source information associated with each story-pair.

The Tanimoto similarity metric may also be used in the practice of this invention. In various exemplary embodiments according to this invention, a modified Tanimoto similarity metric which replaces the binary term indicator with a frequency value may be determined based on the formula:

$$\text{similarity}(d_1, d_2) = \frac{\sum_t w(d_1, t) \cdot w(d_2, t)}{\sum_t w(d_1, t)^2 + w(d_2, t)^2 - w(d_1, t) \cdot w(d_2, t)} \quad (7)$$

The clarity similarity metric is a measure of the distance between term distributions in a story to the term distributions in the clarity model of general English. In various exemplary embodiments according to this invention, a symmetric version of the clarity model is determined based on the formula:

$$\text{similarity}(d_1, d_2) = -KL(w(t,d_1)\|w(t,d_2)) + KL(w(t,d_1)\|GE) - KL(w(t,d_2)\|w(t,d_1)) + KL(w(t,d_2)\|GE) \quad (8)$$

where GE is the probability of words for general English derived over a training corpus and KL is the Kullback-Leibler divergence measure. See for example, Croft et al., "Relevance Feedback and Personalization A Language Modeling Perspective"; in DELOS Workshop: Personalization and Recomniender Systems, Digital Libraries 2001, herein incorporated by reference in its entirety. The clarity similarity metric gives greater emphasis to story-pairs that are very different from general English (GE) and discounts story-pairs that are very close to general English (GE). After the similarity metrics for each story pair or set of K story pairs is determined, control continues to step S1000.

In step S1000, source-pair similarity statistics for each story in the training corpus are determined. For example, in various exemplary embodiments of this invention, the running average, median and variance of the inter-story similarity metric values are determined for each source-pair and/or each similarity metric. After the source-pair similarity statistics for the training corpus are determined, control continues to step S1100.

In various other exemplary embodiments according to this invention, a hierarchy of sources is determined. The source hierarchy is associated with at least one hierarchical relation of source relationships. The source hierarchy is used to provide adjustable substitutions when a new source is identified and/or when source-pair statistics have not yet been accurately determined.

For example, the identified sources represented as source1 and source2 are each associated with characteristics. Source characteristics may include the input method, the original language of the source or any other characteristic. Thus, source characteristics may include, but are not limited to, input language, input mode, source name, genre, current (translated) language or any other characteristic. For example, the source characteristics: Story1.source.input_language="English"; Story1.source.input_mode="TEXT"; Story1.source.Name="New York Times"; Story1.source.genre="editorial"; and Story1.source.current_language="English". indicate that the text in Story1.source.text was captured in English text from a New York Times editorial written in English.

The values of the inter-story similarity metrics for each story-pair and the source-pair similarity statistics are combined to form a similarity vector. The similarity vector and the link label information for each story-pair are used to determine a predictive model and optional confidence score in step S1100. In various exemplary embodiments according to this invention, the values of the story-pair similarity metrics are normalized using the source-pair similarity statistics or any other known or later developed source based normalization technique. The predictive model may be determined using a support vector machine, decision tree induction or any known or later developed method of determining a predictive model. After the predictive model for the link detection system is determined, the predictive model is deployed and/or saved to memory. Control then continues to step S1200 where the process ends. It will be apparent that non-incremental source-identified term frequency-inverse story frequency models may also be used without departing from the scope of this invention.

Figure 3:
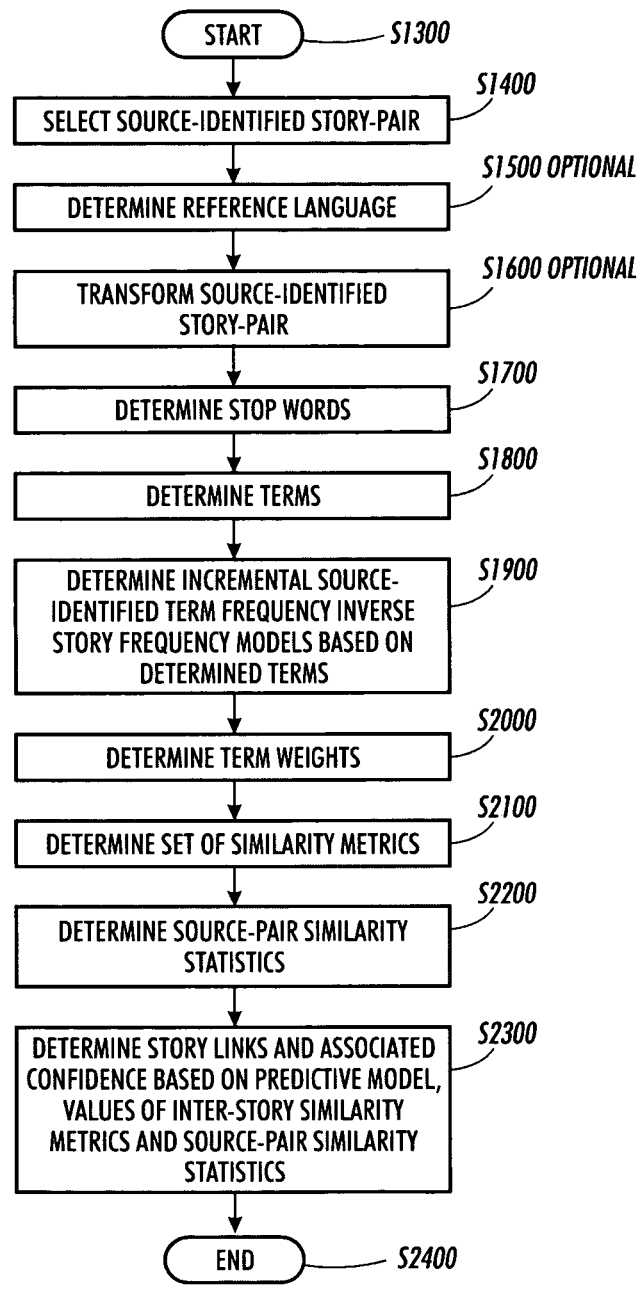
FIG. 3 is a flowchart of an exemplary method for linked event detection according to this invention.

FIG. 3 is a flowchart of an exemplary method for determining linked events according to this invention. The process begins at step S1300 and immediately continues to step S1400.

In step S1400, a first source-identified story is selected. Source-identified stories are stories for which source identification information is available. For example, in various exemplary embodiments according to this invention, a story from an English language newswire service such as Reuters is associated with the source identifier "English:Text". In contrast, a story captured from a CTV television broadcast, transcribed from Mandarin speech utterances to text and translated from Mandarin into English, is associated with a "Mandarin:ASR" source identifier.

A source-identified story may be selected and/or determined dynamically from an information source such as the automatically recognized speech of a television or radio broadcast or retrieved from a digital library, a web server or any known or later developed information repository. The source information associated with the selected story may include the language of the story, the input method of the story, a history of transformations applied to the story or any known or later determined source characteristic useful in clustering and/or grouping stories. After the first source identified story is selected, control continues to optional step S1500.

A reference language is determined in optional step S1500. In various exemplary embodiments according to this invention, the reference language may be selected by the user through a dialog box, a pop-up window, determined automatically based on user information, retrieved from an information store or determined using any known or later developed method of determining a reference language for which a trained model has been and/or can be determined. In various embodiments, the reference language is determined once for each session. For example, a user may select the "English" language as the reference language by selecting from a list of languages displayed in a selection list. Once the reference language is determined, control continues to optional step S1600.

In optional step S1600, transformations are applied to the source-identified source-pair. The transformations may include transcribing speech utterances into text, translating non-reference language stories in the training corpus to the reference language or any known or later developed transformation of the source information. Thus, if English is selected as the reference language, non-English language stories are automatically or manually translated into English. After the story is transformed, control continues to step S1700.

Stopwords in the selected source-identified story are determined and removed in step S1700. Stopwords may be removed based on multiple stopword lists. For example, a first stopword list may include frequently occurring words such as "and", "a", "the" and other high frequency words that add little meaning. A second source-identified stopword list is determined based on the source-identity information.

For example, the speech utterance "one hundred and twenty three" is typically used when discussing the text value "123". Therefore, if the story is captured using automatic speech recognition, the terms "one", "hundred", "and", "twenty", "three" are included. However, if the same story is captured from an optical character recognition of the speaker's text notes the term "123" would be included. These systematic differences may occur due to specific language pair translation errors, transcription errors and the like. Problematic systematic source-pair transformation differences are determined based on the parallel comparison of verified and unverified transformations of a training corpus. The problematic systematic source-pair transformations are added to the source-identified second stopword list.

A verified transformation is a transformation that has been verified or checked for accuracy. For example, the transformation may be performed manually several times and a result agreed as correct. In various other exemplary embodiments, a standard parallel corpus such as United Nations Reports, Hansard's Parliamentary Reports, or any known or later developed method of determining a verified transformation may be used.

The High frequency problematic word transformations are selected and added to the source-identified stopword list. Candidate terms in the selected story that match words in the first stopword list or the second source-identified stopword lists are discarded. After the stopwords are discarded and/or removed, control continues to step S1800.

In step S1800, terms are selected for the incremental source-identified term frequency-inverse story frequency models. Statistically significant terms are selected for addition to the incremental source-identified term frequency-inverse story frequency models. Statistically significant terms may include non-stopwords as well un-translated or non target analysis language terms.

For example, due to translation limitations, a complete translation of all terms in a story may not be possible. That is, some terms and/or context information associated with the term may be difficult or impossible to translate. Automatic translation systems or human translators may leave terms un-translated, tagged with HTML or XML tags or otherwise indicated. In conventional systems, un-translated terms are afforded little or no importance and are often discarded. However, the incremental source-identified term frequency-inverse story frequency models of this invention allow the importance of these un-translated terms to be weighted within source-identified groupings. Therefore, the significance of these un-translated terms may be used to more accurately differentiate stories. After translated and un-translated terms are selected, control continues to step S1900.

In step S1900, the incremental source-identified term frequency-inverse story frequency models are retrieved based on the determined sources and updated with the additional terms. The incremental term frequency-inverse story frequency determination is made for each story.

The source-identified incremental term frequency-inverse story frequency models are refined as new sets of stories are received. In various exemplary embodiments, the source-identified incremental term frequency-inverse story frequency models are updated continuously as each new story is received, updated based on sets of k stories and/or updated based on any known or later developed incremental update method without departing from the scope of this invention.

As each new story or set of stories is determined, new term vectors for the stories are added to the source-identified incremental term frequency-inverse story frequency models. In various exemplary embodiments according to this invention, term frequency-inverse story frequency models are determined based on the formula:

$$df_k(t) = df_{k-1}(t) + df_{C_k}(t) \qquad (9)$$

where $df_{C_k}(t)$ is the number of stories in the newly added set of stories $C_k$ in which term t occurs and $dt_k(t)$ is the number of stories in which term t occurs, after adding the set of stories $C_k$. The initial story counts $df_0(t)$ can be initialized from an empty training set, initialized based on historical information or determined using any other known or later developed initialization method. An optional threshold value is set so that terms having counts below the threshold value are removed from immediate consideration but may be kept for update with the next set of stories $C_{k+1}$. Control then continues to step S2000.

In step S2000, the weights for the selected story terms are determined. The weights for the selected story terms may be initialized with previously determined values derived from analysis of the training corpus and stored in a storage device. New weights are then determined based on the previously initialized values and new weights derived from each new story. For example, updated or new term weights may be determined based on the formula:

$$W_k(d, t) = \frac{1}{Z_k(d)} f(d, t) \cdot \log \frac{N_k}{df_k(t)} \qquad (10)$$

where $N_k$ is the total number of stories in set k and $Z_k(d)$ a normalization value.

The normalization value for probabilistic similarity metrics such as Hellinger, Tanimoto and clarity based similarity metrics may be determined based on the formula:

$$Z_k(d) = \sum_t f(d, t) \cdot \log \frac{N_k}{df_k(t)} \qquad (11)$$

The normalization value $Z_k(d)$ for Euclidean similarity metrics such as the cosine distance are determined based on the formula:

$$Z_k(d) = \sqrt{\sum_t \left[ f(d, t) \cdot \log \frac{N_k}{df_k(t)} \right]^2} \qquad (12)$$

After the term weights are determined, a weighted term vector is determined based on the selected terms and the term weights. Control then continues to step S2100.

The set of similarity metrics for the story-pair is determined in step S2100. In various exemplary embodiments of this invention, the previously determined sets of similarity metrics for the stories may be retrieved from a data structure in memory, retrieved from a disk store, determined dynamically or otherwise evaluated.

A set of similarity metrics that measures the similarity between the selected story-pair is determined. For example, the Hellinger metric, the Tanimoto metric, the clarity metric and the cosine-distance similarity metric may be used as elements in a set of similarity metrics. Discrete sets of similarity metrics are associated with story pairs formed from the selected story and each previous story.

The cosine-distance similarity metrics for the selected story-pair are determined based on the formula:

$$\text{similarity}(d_1, d_2) = \sum_t w(d_1, t) \cdot w(d_2, t) \qquad (13)$$

In various other exemplary embodiments, cosine-distance similarity metrics may be normalized based on source-pair information. The source-pair normalization further adjusts the determination of a story link. For example, the cosine-distance metric may be normalized by subtracting the running median of similarity values corresponding to the sources of the selected pair of stories. Thus, it will be apparent that any normalization based on the source of the selected stories may be used.

The Hellinger similarity metric used to compare the selected story-pair may be determined based on the formula:

$$\text{similarity}(d_1, d_2) = \sum_t \sqrt{w(d_1, t) \cdot w(d_2, t)} \qquad (14)$$

The Hellinger similarity metric may also be normalized based on the source information associated with the selected pair of stories.

The Tanimoto similarity metric is used to compare the selected story-pair. The Tanimoto similarity metric describes the number of terms shared between two stories. In various exemplary embodiments, a modified Tanimoto similarity metric which replaces the binary term indicator with a frequency value may be determined based on the formula:

$$\text{similarity}(d_1, d_2) = \frac{\sum_t w(d_1, t) \cdot w(d_2, t)}{\sum_t w(d_1, t)^2 + w(d_2, t)^2 - w(d_1, t) \cdot w(d_2, t)} \qquad (15)$$

The clarity similarity metric used to compare the selected story-pair includes a measure of a story's distance from a model of general English. In various exemplary embodiments according to this invention, a symmetric version of the clarity model is used. An exemplary clarity similarity metric may be determined based on the following formula:

$$\text{similarity}(d_1,d_2) = -KL(w(t,d_1)\|w(t,d_2)) + KL(w(t,d_1)\|GE) - KL(w(t,d_2)w(t,d_1)) + KL(w(t,d_2)\|GE) \qquad (16)$$

where GE is the probability of words for general English derived from a training corpus and $KL(w(t,d_1)\|w(t, d_2))$ is the Kullback-Leibler divergence between $w(t, d_1)$ and $w(t, d_2)$. See for example, Croft et al., "Relevance Feedback and Personalization A Language Modeling Perspective"; in DELOS Workshop: Personalization and Recommender Systems, Digital Libraries 2001. The clarity similarity metric gives greater emphasis to story-pairs that are very different from general English and discounts or de-emphasizes story-pairs that are close to general English. After the set of similarity metrics for the story-pair have been determined control continues to step S2200.

In step S2200, the source-pair similarity statistics are determined. For example, in various exemplary embodiments according to this invention, the source-pair similarity statistics are retrieved from a memory, a disk storage device or any known or later developed storage device based on the identified source for each story. Thus, if a "Mandarin:ASR" identified source story is to be compared to an "English:TEXT" identified story, the "Mandarin:ASR:English:TEXT" identified source-pair statistics are retrieved and used to normalize the values of the set of similarity metrics.

In various other exemplary embodiments, a hierarchy of sources is determined based on hierarchical source relationships. The source hierarchy is used to provide adjustable substitutions when a new source is identified and/or when source-pair statistics have not yet been accurately determined.

For example, in various exemplary embodiments according to this invention, the identified sources may be represented as source1 and source2. Each source is associated with characteristics. Source characteristics may include the input method, the original language of the source or any other characteristic. Thus, source characteristics include, but are not limited to, Story1.source.input_language="English" Story1.source.input_mode="TEXT", Story1.source.Name="New York Times", Story1.source.genre="editorial" and Story1.source.current_language="English". The above identified source characteristics indicate that the text in Story1.source.text was captured in English text from a New York Times editorial is written in the English language.

As pairs of stories are compared, the most specific or closely matching statistics based on source characteristics are determined. A backup to more general statistics is performed if the specific similarity statistics for a source-pair do not exist. For example, in one of the various exemplary embodiments according to this invention, values for "statistics. [story1.source1, story2.source2]. Tanimoto.median" are accumulated. Similarity statistics for subsequent stories sharing the same source characteristics are also added to the term "statistics.[story1.source1, story2.source2]. Tanimoto.median." However, the similarity statsitics for subsequent stories may also be added to the parent nodes in the source hierarchy to update the more general statistics. The similarity statistics source hierarchy facilitates the substitution of a related set of similarity statistics when a new source-pair is encountered. The related similarity statistics are determined by identifying the lowest ancestor source node shared by the new source and the existing sources. Thus, in various exemplary embodiments according to this invention, portions or all of the available source characteristic information may be used to determine adaptable substitute similarity statistics.

It will be apparent that a corresponding bottom up view of the source hierarchy may also be used without departing from the scope of this invention. Thus, the determination of substitute similarity statistics for new sources may be determined by calling a backup function with two sources as arguments if it is determined that no similarity statistics exist for the pair of sources. That is, new story3 associated with the new source characteristics, story3.source.input_language="Arabic", story3.source.input_mode="ASR", story3.source.Name="Aljazeera", story3.source.genre="news" and story3.source.current_language="English" has not previously been paired with the source associated with story1. Since no language and genre identified source-pair statistics exist, a backup function backup(story1.source, story3.source) is called to determine parent nodes in the similarity statistics source hierarchy that share source characteristic.

For example, in one of the various exemplary embodiments according to this invention, the backup function traverses the similarity statistics source hierarchy by backing up to higher nodes associated with progressively more aggregated similarity statistics. The backup process continues to higher parent nodes until a match is found for the available source characteristics relating the source for story1 and the new source for story3. It will be apparent that any known or later developed source characteristics or method of ordering sources may be used to determine a source hierarchy without departing from the scope of this invention. Moreover, it will be apparent that any backup, shrinkage or smoothing of statistics may also be used in the practice of this invention.

In various other exemplary embodiments according to this invention, a source hierarchy is based on the characteristics of language and input mode identified for each source. A fine-grained similarity statistics table contains entries for each possible combination of identified sources and a course-grained statistics table holds aggregations of the fine-grained similarity statistics table entries.

The course-grained statistics table may be constructed by reducing the number of states associated with a source characteristic. For example, stories from multiple languages may be aggregated based on whether or not the story language matches the reference language. Reference language and non-reference language statistics for each remaining source characteristic are then determined. In this way, more general or course-grained statistics are determined. When a source is encountered for which no specific fine-grained source-pair similarity statistic exists, a course-grained alternative source-pair similarity statistic is used. The course-grained source-pair similarity statistic is based on progressively less constrained matches of source characteristics.

In various exemplary embodiments according to this invention, lookup operations in the fine and course statistic tables may be reduced by initially filling fine-grained statistics table entries, for which no entry exists, with entries from the course-grained statistics table. In various exemplary embodiments according to this invention, the combined fine/course-grained source-pair statistics are updated with each new set of stories. Although a fine and course-grained ordering based on the reference language is described, it will be apparent that any ordering of the source hierarchy based on the relationship of the sources may be used. Moreover, in various other exemplary embodiments according to this invention, additional attributes such as genre, style, transformations applied and the like may also be used to partition the source hierarchy.

As new sources are identified, a related source-pair similarity statistic is selected from the source hierarchy based on source characteristics. The partitions of the source hierarchy allow adaptable substitution of more specific initial source-pair similarity statistics for newly encountered sources. Control then continues to step S2300.

In step S2300, a predictive model is retrieved. The predictive model is retrieved from a memory or a disk, determined dynamically or determined using any known or later developed method of determining a predictive model.

The link detection system determines if a story-pair is linked based on the predictive model and the similarity vector. The similarity vector is composed of the similarity metrics and the source-pair statistics for the story-pair. A confidence score of the predicted link between stories in a story-pair may also be determined by the link detection system. For example, in various exemplary embodiments, the confidence score may be a numeric confidence score, a yes/no indicator or any output useful in indicating the confidence associated with the link prediction. After the link detection system determines whether the story-pair are linked, control continues to step S2400 and the process ends. It will be apparent that although incremental source-identified term frequency-inverse story frequency models are described in various exemplary embodiments according to this this invention, non-incremental source-identified term frequency-inverse story frequency models may also be used in the practice of this invention.

Figure 4:
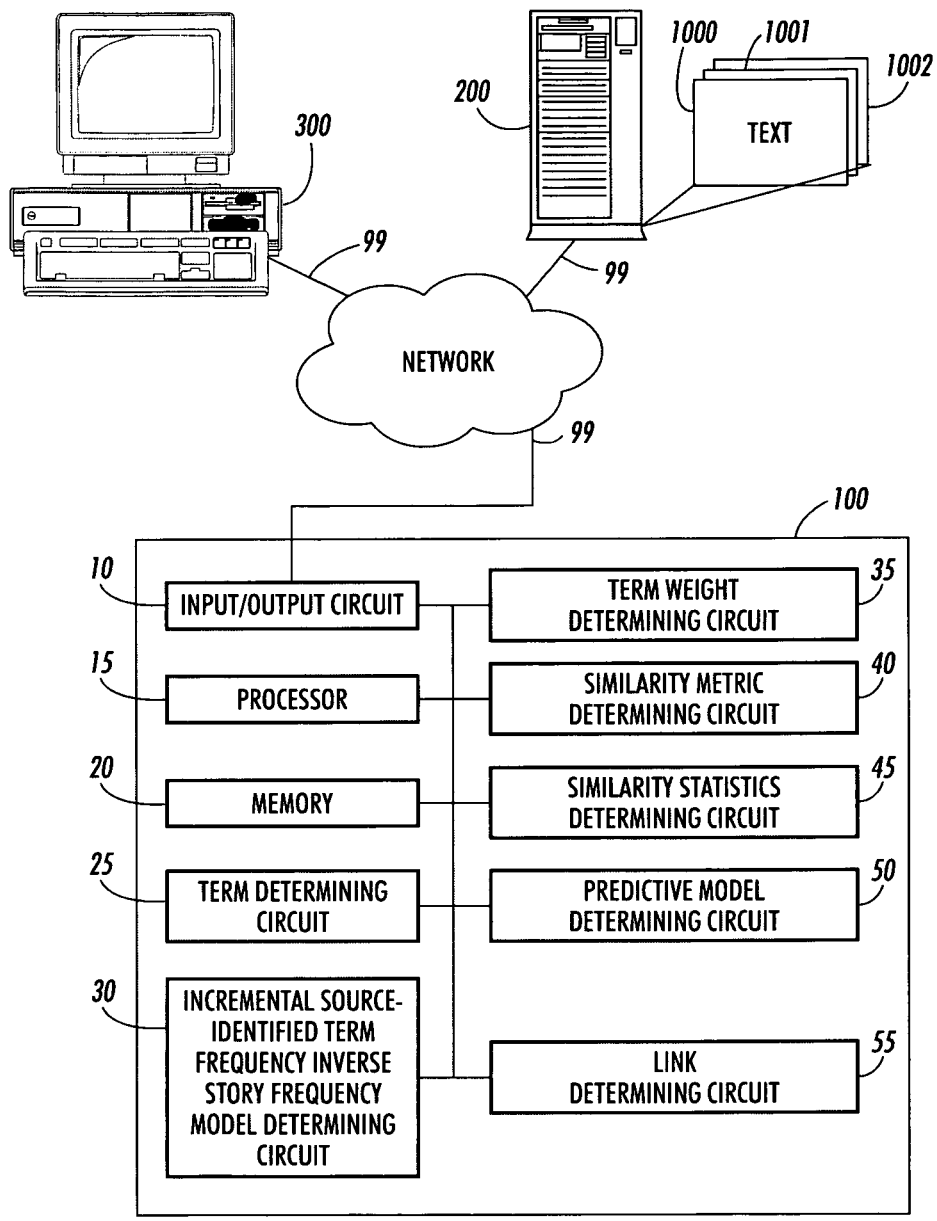
FIG. 4 shows an exemplary linked event detection system according to this invention.

FIG. 4 shows an exemplary linked event detection system 100 according to this invention. The linked event detection system 100 comprises an input/output circuit 10, a processor 15, a memory 20, a term determining circuit 25, an incremental source-identified term frequency-inverse story frequency model determining circuit 30, a term weight determining circuit 35, a similarity metric determining circuit 40, a similarity statistics determining circuit 45, a predictive model determining circuit 50 and a link determining circuit 55.

An information repository 200 contains a corpus of source-identified training stories 1000-1001 and new story 1002. The corpus of source-identified stories 1000-1001 are associated with link label information indicating the presence or absence of a link between events in each story.

A user of personal computer 300 initiates a request over communications link 99 to the link detection system 100 to determine a predictive model for the link detection system 100. The request is received by the link detection system 100. The processor 15 activates the input/output circuit 10 to retrieve the source-identified stories 1000-1002 over communications link 99 and store the source-identified stories in memory 20.

Optional stopword removal and transformations are performed on the stories by the processor 15. For example, in various exemplary embodiments according to this invention, a pre-determined reference language is retrieved from memory 20 and/or dynamically determined. Retrieved stories that are not in the reference language are optionally translated to the reference language.

The processor 15 then activates the term determining circuit 25 to determine which terms to add to the incremental source-identified term frequency-inverse story frequency models. For example, quoted non-reference language words may be inserted by manual or automatic translators to retain as much context for difficult or impossible to translate words. The term determining circuit 25 determines which of the reference language and non-reference language words should be added to the incremental source-identified term frequency-inverse story frequency models.

The incremental source-identified term frequency-inverse story frequency determining circuit 30 is then activated to determine incremental source-identified term frequency-inverse story frequency models based on the determined terms. In various other embodiments, non-incremental source-identified term frequency-inverse story frequency models are used. The term weight determining circuit 35 is then activated to weight the terms in the incremental source-identified term frequency-inverse story frequency models. Exemplary term weights are determined based on the formula:

$$w_k(d, t) = \frac{1}{Z_k(d)} f(d, t) \cdot \log \frac{N_k}{df_k(t)} \qquad (17)$$

where t reflects terms in the story d, $N_k$ is the total number of stories in set k and $Z_k(d)$ is a normalization value. The processor 15 then activates the similarity metric determining circuit 40.

The similarity metric determining circuit 40 determines inter-story similarity metrics such as the Hellinger metric, the Tanimoto metric, the clarity-distance metric, the cosine-distance metric or any known or later developed inter-story similarity metric. In various other exemplary embodiments according to this invention, source-pair similarity statistics such as the running median, mean, variance and the like are determined for each similarity metric and/or each source-pair by the similarity statistics determining circuit 45. The determined values of the similarity metrics are then optionally normalized based on the similarity statistics.

The predictive model determining circuit 50 is activated to determine a predictive model for the link detection system. The predictive model is determined based on link label information, the similarity metrics and the source-pair similarity statistics for each story-pair. In various exemplary embodiments according to this invention, the predictive model is determined using a support vector machine, a decision tree inducer, a classifier or any other known or later developed method of determining a predictive model. The predictive model is then stored in memory 20 and/or deployed.

The link detection system 100 determines whether a first story 1000 and the new story 1002 are linked. Stopwords are removed and terms in the new story are selected using the term determining circuit 25. An incremental source-identified term frequency-inverse story frequency model based on the terms is determined by the incremental source-identified term frequency-inverse story frequency model determining circuit 30. Inter-story similarity metrics are determined by the similarity metric determining circuit 40 and source-pair similarity statistics determined by the similarity statistics determining circuit 45.

In various exemplary embodiments according to this invention, the inter-story similarity metrics are normalized based on the source-pair statistics. The link determining circuit 55 is then activated. The link determining circuit 55 predicts whether the first story 1000 is linked to new story 1002 based on the predictive model and the values of the similarity metrics and the source-pair similarity statistics for the first story 1000 and new story 1002 story-pair. In various other exemplary embodiments according to this invention, the link detection system 100 indicates a confidence score useful in assessing the story link prediction. The link prediction and/or confidence score is then returned over communications links 99 to personal computer 300 and stored in information repository 200 for later re-use or used in any further processing.

Figure 5:
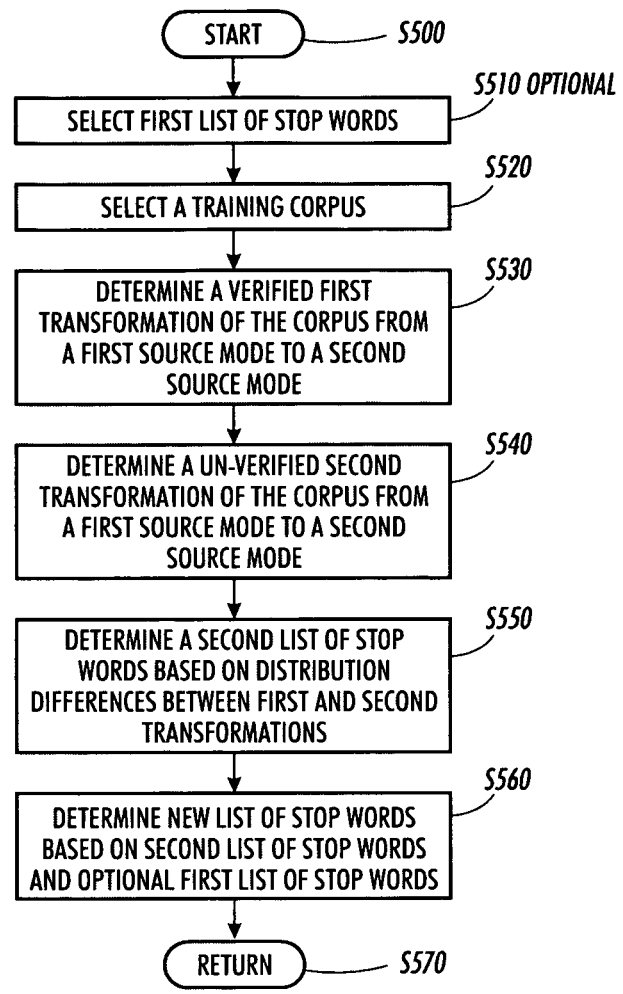
FIG. 5 is an expanded flowchart of an exemplary method of source-identified stopword removal according to this invention.

FIG. 5 is an expanded flowchart of an exemplary method of source-identified stopword removal according to this invention. Control begins at step S500 and immediately continues to optional step S510. In step S510, a first list of stopwords is selected. The first list of stopwords may be read from memory, a floppy disk, a CD-ROM or other device. The first stopword list is determined through statistical analysis of words having a high frequency of occurrence but which add little meaning to a story. Thus, words such as "and", "a", "the" and other high frequency, low information content words are contained in the first stopword list. After the first list of stopwords is selected, control continues to step S520.

In step S520, a training corpus is selected. The training corpus may be created from automatically recognized speech utterances transcribed to text, text files from a digital library, HTML or web pages served by a web server, or any known or later developed information source. Control continues to step S530.

A verified first transformation of the corpus from a first mode to a second mode is determined in step S530. For example, in one exemplary embodiment according to this invention, verified transcriptions of the training corpus from speech utterances to text using automatic speech recognition are determined. It will be apparent that other transformations such as language translations may be similarly verified using known translations such as the United Nations official reports, Hansard's official English/French translations of Canadian Parliamentary Reports and/or any known or later developed parallel corpus of verified transformed text. Once the verified first transformation is determined, control continues to step S540.

In step S540, an un-verified second transformation of the corpus from a first mode to a second mode is determined. The un-verified second transformation reflects the actual use of the transformation within a process or system. The errors induced by the transformation are reflected in the un-verified second transformation of the corpus. After the un-verified second transformation is determined, control continues to step S550.

A second list of stopwords is determined based on differences in the word frequency distribution between the first and second transformations, in step S550. For example, the second unverified transformation is compared to the first verified transformation of the corpus. Differences in the second unverified transformed text reflect potential systematic transformation errors. A statistical test is used to determine systematic errors induced by the transformation. The systematic errors are added to a second stopword list and control continues to step S560.

In step S560, candidate terms matching either the first or second stopword lists are removed. Control then continues to step S570 and returns to step S500 of FIG. 1. It will be apparent that in various other exemplary embodiments according to this invention, the determination of a first stopword list may be omitted without departing from the scope of this invention. Moreover, it will also be apparent that in various other exemplary embodiments according to this invention, transformations can occur based on the determination of a systematic error. Transcription normalization and repair may be invoked to automatically normalize an ASR source text. Systematic translation errors are then automatically corrected. For example, in various exemplary embodiments according to this invention, currency symbols such as "$", "¥" and "£" in a text story may be transformed into the corresponding written equivalents "dollar", "yen" and "pound". Acronyms such as "DARPA" that are recognized with conventional automatic speech recognition systems frequently result in a recognized text acronym with letters interspersed with spaces "D A R P A". However, the various exemplary embodiments according to this invention recognize and correct these systematic transformation errors resulting in a more accurate transcription of acronyms and other problematic transformations.

Figure 6:
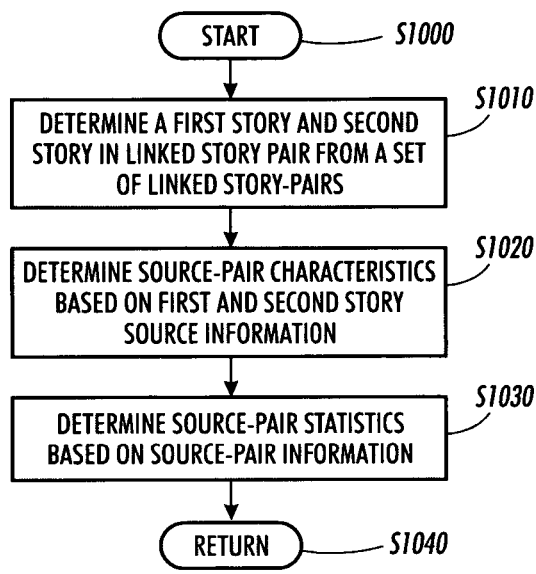
FIG. 6 is an expanded flowchart of a method for determining source-pair similarity statistics according to this invention.

FIG. 6 is an expanded flowchart of a method for determining similarity statistics according to this invention. The process begins at step S1000 and immediately continues to step S1010.

In step S1010, a linked story pair comprising a first and second story is determined. Linked story-pairs may be determined based on a previously labeled training corpus. The story pair may be retrieved from a digital library, a webserver or any known or later developed information repository. In various other exemplary embodiments according to this invention, the story pairs may be dynamically determined based on received newswire broadcasts or other known or later developed information sources. After the story pair is determined, control continues to step S1020.

Source pair characteristics associated with the story pair are determined in step S1020. In various exemplary embodiments according to this invention, the source of a story may be a CNN, ABC, NBC, Aljazeera or CTV television broadcast, the text of a Reuters newswire service story, an article in the Wall Street Journal or any other known or later developed information source. In various exemplary embodiments according to this invention, the source characteristics associated with each source in a source-pair are used to select source-pair similarity statistics from the source hierarchy. The source hierarchy may be based on source characteristics such as source language, input mode and the like.

An English radio broadcast captured using automatic speech recognition may be associated with an "English" language source characteristic and an "ASR" input mode source characteristic. A Chinese text translated into English may be associated with a "Chinese" source language characteristic and a "TEXT" input mode characteristic. The two stories thus form a story pair having "English:ASR" and "Chinese: TEXT" source pair characteristics. After the source pair information is determined, control continues to step S1030.

In step S1030, the source pair statistics are determined based on the source characteristics of the stories in the source-pair. Specific source pair statistics are maintained for each identified source pair. The source pair statistics may include the cumulative mean, median, variance or other measure of previously encountered similarity metric values associated with the identified source pair. Cumulative statistics are maintained for aggregations of the source pairs based on source characteristics. For example, the first level aggregations of the source hierarchy partitions the sources based on a match with the reference language. Thus, for an exemplary English reference language, courser grained source-pair similarity statistics are created based on English:English and English:non-English language pairs. When a new source is determined, a related but courser grained aggregated similarity statistic is substituted for missing source pair statistics. As additional stories sharing the source characteristics are encountered, the substitute source-pair similarity statistic is refined with further updates. Control continues to step S1040 and the process returns to step S1000 of FIG. 2.

FIG. 7 shows an exemplary data structure for storing similarity vectors 600 according to this invention. Each row of the exemplary data structure for storing similarity vectors 600 is a similarity vector. The exemplary data structure for storing similarity vectors 600 is comprised of first and second story identifier portions 601-602, a Hellinger similarity metric portion 611, a Tanimoto similarity metric portion 612, a clarity metric portion 613, a cosine-distance metric portion 614, a source-pair cosine-mean similarity statistics portion 621, a source-pair cosine-median similarity statistics portion 622, a source-pair cosine-variance similarity statistics portion 623, a running mean cosine-distance similarity statistics portion 631 and a running median cosine-distance similarity statistics portion 632. Additional and/or other similarity metrics and/or similarity statistics associated with the similarity metrics may also be used in the practice of this invention. Thus, statistics associated with the running median, mean, variance and other measures of the Hellinger, Tanimoto, clarity or any other metric may also be used in the practice of this invention.

The Hellinger similarity metric portion 611, the Tanimoto similarity metric portion 612, the clarity metric portion 613 and the cosine-distance metric portion 614 comprise a set of similarity metrics. Similarly, the source-pair cosine-mean similarity statistic portion 621, the source-pair cosine-median similarity statistic portion 622, and the source-pair cosine-variance similarity statistic portion 623, the running meadian cosine portion 631 and the running median cosine portion 632, comprise a set of source-pair statistics. The similarity metrics and the source-pair statistics are associated with the story pair specified by the first and second story identifiers 601-602.

In the first row of the exemplary data structure for storing similarity vectors 600, the first story identifier portion 601 contains a "1000" value and the second story identifier portion 602 contains a "1001" value. The first and second story identifiers 601-602 thus form a unique story-pair.

The Hellinger metric portion 611 of the exemplary data structure for storing similairty vectors 600 contains a value of "0.00404" indicating the degree of similarity between the "1000:1001" story pair. In various other exemplary embodiments according to this invention, the Hellinger similarity metric may be source-pair normalized. That is the running source-pair median or any known or later developed source based statistical measure, is subtracted from the determined Hellinger metric. In this way a source-pair normalized Hellinger metric value is determined that reduces noise while increasing the sensitivity of the similarity metric to source specific informational features.

The Tanimoto metric portion 612 contains a value of "0.00014". This indicates the determined degree of similarity between the "1000:1001" story pair based on the Tanimoto similarity metric. In various exemplary embodiments according to this invention, the Tanimoto similarity metric may also be source-pair normalized. That is the running median or other source based statistical measure may be subtracted from the determined Tanimoto metric value to create a source-pair normalized Tanimoto metric value which has reduced noise and increased sensitivity to the source specific informational features.

The clarity metric portion 613 contains a value of "0.02795". This indicates the determined degree of similarity between the "1000:1001" story pair based on the clarity similarity metric. In various exemplary embodiments according to this invention, the clarity similarity metric may be source-pair normalized. A running median or other source based statistical measure is subtracted from the determined clarity metric value to create a source-pair normalized clarity metric value.

As discussed above, the source-based normalization reduces noise while increasing the sensitivity of the similarity metric to source specific information. It will be apparent that the practice of this invention is not limited to the use of the Hellinger, Tanimoto, clarity and cosine distance similarity metrics. Any known or later developed similarity metric that measures the degree of relatedness between stories may be used without departing from the scope of this invention. Moreover, normalization may be performed using subtraction, dividing by the variance, histogram normalization or any other normalization method.

The cosine-distance metric portion 614 contains a value of "0.00090". This indicates the determined degree of similarity between the "1000:1001" story pair based on the clarity similarity metric. The cosine-distance similarity metric may also be source-pair normalized by subtracting the running median of the source-pair or other source based statistical measure from the determined cosine-distance metric value. The source-based normalization reduces noise and/or increases the sensitivity of the metric to source specific informational features.

The source-pair similarity statistical cosine-mean portion 621 contains a value of "0.20932". This indicates that the similarity metric values associated with the identified source-pair has a mean value of "0.20932". As discussed above, the similarity statistics may be associated alone or in combination with specific similarity metrics such as the Hellinger similarity metric, the Tanimoto similarity metric or any known or later developed similarity metric without departing from the scope of this invention the source-pair cosine-median similarity statistics portion 622 has a value of "0.15459" and the source-pair cosine-variance similarity statistis portion 623 has a value of "0.02733". Thus, the specified source-pair is associated with the source-pair statistics values of "0.20932, "0.15459 and "0.02733" for the mean, median and variance.

The running mean cosine-distance similarity statistics portion 631 contains a value of "0.00803". The running mean reflects the cumulative mean value of cosine-distance metric. Similarly, the running median of the cosine-distance similarity metric contains a value of "0.00803" reflecting the cumulative median value of the cosine-distance similarity statistics portion 632. As discussed above, the running mean of the cosine-distance metric and the running media of the cosine-distance metric may be used to adjust the cosine-distance metric values. Although the exemplary embodiments describes the use of the running mean and median of the cosine-distance similarity metric, it will be apparent that any known or later developed normalization value for any similarity metric may be used without departing from the scope of this invention.

FIG. 8 shows an exemplary data structure for storing link label information 700 according to this invention. The data structure for storing link label information 700 is comprised of a first story identifier 601, a second story identifier 602, and a link information portion 701.

In the first row of the exemplary data structure for storing link label information 700, the first story identifier 601 contains the value "1000" and the second story identifier contains the value "1001". The values of the first and second story identifier 601-602 values indicate the story-pair for which link label information is provided. The link label information portion 701 encodes a yes/no flag indicated by a "1" value for "yes" and a "0" value for "no". It will be apparent that in various other exemplary embodiments according to this invention, the link label information portion 701 may encode a value "1.0" indicating the probability of a link between the stories identified by first story identifier 601 and the second story identifier 602. In this case, a value of "1.0" or a value above some threshold value, indicates a prediction that the stories are linked and a value of "0.0" or a value below the threshold value indicated the stories are not linked.

In various other exemplary embodiments according to this invention, a confidence score associated with the link information may also be determined. However, it will be apparent that any known or later developed data structure may be used for storing link label. For example, data storage requirements for the exemplary data structure for storing link label information 700 may be reduced by recording only first and second story identifier information for actual links. Thus, in one exemplary embodiment according to this invention, stories for which links do not exist are not stored in the exemplary data structure for storing link label information 700, thereby reducing storage requirements.

The link label information stored in the exemplary data structure for storing link label information 700 is used in conjunction with determined inter-story similarity metrics and source-pair similarity statistics to determine a predictive model for the link detection system. The link status of new story-pairs is determined by the link detection system based on the similarity metrics for each story-pair, the associated source-pair similarity statistics and the predictive model.

FIG. 9 shows an exemplary data structure for storing fine-grained source-identified statistical information 800 according to this invention. The exemplary data structure for storing fine-grained source-pair statistical information 800 is comprised of a source language pair portion 801, an ASR:ASR portion 802, an ASR:TEXT portion 803 and a TEXT:TEXT portion 804. The source language pair portion 801 describes the various possible source language pairs. The ASR:ASR portion 802 indicates statistics associated with the "ASR:ASR" input mode pair. The ASR:TEXT portion 803 indicates statistics associated with the ASR:TEXT input mode pair. Similarly TEXT:TEXT portion 804 indicates statistics associated with the TEXT:TEXT input mode pair.

The source language pair portion 801 of the first row of the exemplary data structure for storing fine-grained source-pair statistical information 800, contains the value "English:English" indicating that each statistic in the row reflects "English:English" language pairs. The remaining rows in the table indicate other possible language combinations.

In the first row, the ASR:ASR portion 802 contains the data structure "a". The "a" data structure is associated with cumulative source-pair similarity statistics associated with the "ASR:ASR" input mode for the English:English" language pair. For example, the data structure "a" may be an array containing values such as a.mean=0.25, a.median=0.26 and a.variance=0.01 and the like.

Similarly, the ASR:TEXT portion 803 contains the data structure "b". The "b" data structure is associated with cumulative source-pair similarity statistics associated with the "ASR:TEXT" input mode for the English:English" language pair. For example, the data structure "b" may be an array containing values such as b.mean=0.26, b.median=0.27 and b.variance=0.02 and the like.

The TEXT:TEXT portion 804 contains the data structure "c". The "c" data structure is associated with cumulative source-pair similarity statistics associated with the "TEXT:TEXT" input mode for the English:English" language pair. For example, the data structure "c" may be an array containing c.mean=0.27, c.median=0.28 and c.variance=0.03 values.

When a similarity statistic for a new source is not reliably available in the data structure for storing fine-grained source-pair statistical information 800, a related substitute source-pair similarity statistic for the new source is determined based on a source hierarchy. The source hierarchy defines the relatedness of the sources based on source characteristics. Thus, in one of the various exemplary embodiments according to this invention, related statistics for new sources are retrieved from a course-grained source-pair statistics table that encodes a course-grained inter-relationship of the sources.

FIG. 10 shows an exemplary data structure for storing course-grained source-pair statistical information according to this invention. The exemplary data structure for storing course-grained source-pair statistical information 900 is comprised of a source language pair portion 901, an ASR:ASR portion 902, an ASR:TEXT portion 903 and a TEXT:TEXT portion 904. The source language pair portion 901 describes the various possible source language pairs. The ASR:ASR portion 902 indicates whether statistics are associated with the "ASR:ASR" characteristic. The ASR:TEXT portion 903 indicates statistics associated with the "ASR:TEXT" combination. Similarly TEXT:TEXT portion 904 indicates statistics associated with the "TEXT:TEXT" combination.

The first row of the course grained statistics table 900 contains the value "English:English", the second row contains the value "English:non-English" and the third row contains the value "non-English:non-English". These categories reflect a course grained classification of the source language characteristic using English as the reference language.

In the first row, the ASR:ASR portion 902 contains the data structure "a". The "a" data structure is associated with cumulative similarity metric statistics associated with the "ASR:ASR" input mode for the English:English" language pair. For example, the data structure "a" may be an array containing a.mean=0.25, a.median=0.26 and a.variance=0.01 values.

In various other exemplary embodiments according to this invention, the source pair similarity metric statistics may be discussed with respect to an exemplary statistics[source1, source2] data structure or the like. Source1 reflects the source associated with the "English" language and "ASR" input mode characteristics. Similarly, source2 is associated with "non-English", and "TEXT" input mode characteristics. Individual source-pair statistics are retrieved using operations of the form statistics[source1, source2].Tanimoto.mean=0.25 and the like. It will be apparent however that any data structure or naming convention useful in storing source-pair similarity statistics may be used in the practice of this invention.

Similarly, the ASR:TEXT portion 903 contains the data structure "b". The "b" data structure is associated with cumulative source-pair similarity statistics associated with the "ASR:TEXT" input mode for the English:English" language pair. For example, the data structure "b" may be an array containing b.mean=0.26, b.median=0.27 and b.variance=0.02 values.

The TEXT:TEXT portion 904 contains the data structure "c". The "c" data structure is associated with cumulative source-pair similarity statistics associated with the "TEXT:TEXT" input mode for the English:English" language pair. For example, the data structure "c" may be an array containing c.mean=0.27, c.median=0.28 and c.variance=0.03 values.

Figure 11:
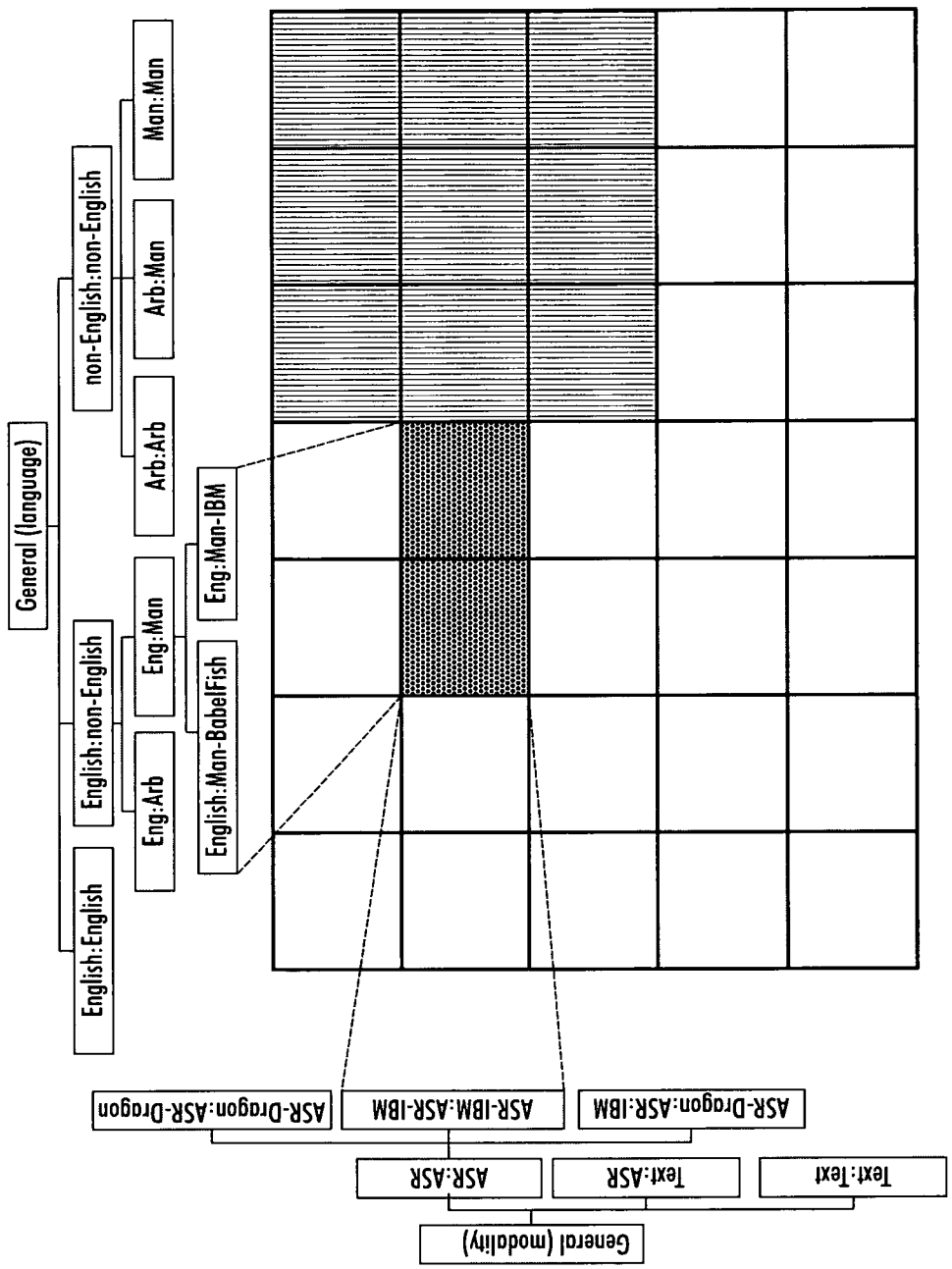
FIG. 11 shows an exemplary inter-relation of two source hierarchies according to this invention.

FIG. 11 shows an exemplary inter-relation of two source hierarchies. Each source hierarchy corresponds to a general to specific ordering based on one or more source characteristics. For example, the first source hierarchy, based on language characteristics, has a general root node. The general root node reflects the accumulation of all source-pair similarity statistics. The general or root node similarity statistics therefore reflect a general substitute for a newly determined source. That is, since the source is new, no detailed source-pair statistics have yet been determined. Thus the most general available substitute similarity statistic is the general or root node. Child nodes descending from the root node reflect progressively more specific source characteristics. For example, in various exemplary embodiments according to this invention, the first level nodes reflect a course-grained partitioning of the sources based on a reference language. Second level nodes reflect a finer-grained partitioning of the sources into reference language and non-reference language source pair combinations such as English and non-English. In another exemplary embodiment, as additional non-reference language sources are determined, additional child nodes are added at the second level. Thus, if English is the reference language, Arabic, Chinese or other non-English sources are added as additional non-reference language child nodes. However, sources may be grouped by input language, non-reference language, language family such as European Cyrillic input language and the like without departing from the scope of this invention. In various other exemplary embodiments according to this invention, additional level child nodes are added to represent additional source characteristics such as the type of translation system used to translate the stories. It will be apparent that the source hierarchy is not limited in the number of levels and may be based on any method of arranging source relationships without departing from the scope of this invention. Source-characteristic information associated with the new source and existing sources thereby allows an adjustable tuned adaptation of the initial source-pair similarity statistics.

A second source hierarchy based on input mode characteristics also has a general root node. The general root node reflects the accumulation of all source-pair similarity statistics. The general or root node similarity statistics are applicable to any new source. However, as discussed above, the degree of shared source characteristics allows for an adaptation of the source-pair similarity statistics for each new source. The child nodes descending from the root node reflect progressively more specific input mode characteristics. For example, in various exemplary embodiments according to this invention, the first level nodes reflect a course-grained partitioning of the sources based on the TEXT and ASR combinations. Second level nodes reflect a partitioning of the ASR:ASR source combinations based on the manufacturer or type of automatic speech recognition system.

In various other exemplary embodiments according to this invention, multiple source hierarchies may be used. In one exemplary embodiment according to this invention, the first and second source hierarchies are inter-related using a combined source table. The leaves of the first source hierarchy form columns in the combined source table while the leaves of the second source hierarchy from rows in the combined source table. However, it will be apparent that the terms first and second are used merely for clarity of discussion and that any number of source hierarchies may be inter-related. For example, the seven leaf nodes of the language based source hierarchy are reflected in the seven columns of the combined source table. The five leaf nodes of the input-mode based source hierarchy are reflected in the five rows of the combined source table.

Cells of the table reflect source-pairs. If there is enough data in a cell, then that leaf is used, otherwise the marginal statistics are accumulated over the samples in the leaves corresponding to the parent of the leaf for which statistics are desired. For example, if English:Mandarin-BabelFish has enough statistics in the ASR-IBM:ASR-IBM case, then it is used, otherwise the marginal values in the first set of squares are used. If there still aren't enough statistics, the backing off may occur to a node farther up the tree, such as English:non-English, so that the margin over the nodes English:Arabic, English:Mandarin-BabelFish and English:Mandarin-IBM is used.

The backing off process may be done in multiple dimensions. For example, if there are enough samples only in ASR:ASR and non-English:non-English, then the samples in the second square would be combined. If there is enough data from one source, then that source is used. If there is not enough data from one source then the source hierarchy is used.

Each of the circuits 10-55 of the linked event detection 100 system described in FIG. 4 can be implemented as portions of a suitably programmed general-purpose computer. Alternatively, 10-55 of the linked event detection system 100 outlined above can be implemented as physically distinct hardware circuits within an ASIC, or using a FPGA, a PDL, a PLA or a PAL, or using discrete logic elements or discrete circuit elements. The particular form each of the circuits 10-55 of the linked event detection system 100 outlined above will take is a design choice and will be obvious and predicable to those skilled in the art.

Moreover, the linked event detection system 100 and/or each of the various circuits discussed above can each be implemented as software routines, managers or objects executing on a programmed general purpose computer, a special purpose computer, a microprocessor or the like. In this case, linked event detection system 100 and/or each of the various circuits discussed above can each be implemented as one or more routines embedded in the communications network, as a resource residing on a server, or the like. The linked event detection system 100 and the various circuits discussed above can also be implemented by physically incorporating the linked event detection system 100 into software and/or a hardware system, such as the hardware and software systems of a web server or a client device.

As shown in FIG. 4, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 4 can each be any device or system for connecting a communication device to the linked event detection system 100, including a direct cable connection, a connection over a wide area network or a local area network, a connection over an intranet, a connection over the Internet, or a connection over any other distributed processing network or system. In general, the communication links 99 can be any connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method of determining predictive models for a linked event detection system comprising the steps of:
    determining source-identified training stories;
    determining inter-story similarity vectors in a memory for at least one story-pair of the source-identified training stories;
    determining link label information for the at least one story-pair, the link label information indicating the existence of at least one link between a pair of stories in the source-identified training stories and that the linked source-identified stories are related to the same event; and
    determining and storing at least one predictive model in the memory based on the inter-story similarity vectors and the link label information.

2. The method of claim 1, wherein the step of determining inter-story similarity vectors comprises the steps of:
    determining at least one inter-story similarity metric for the story-pairs; and
    determining at least one source-pair statistics for the at least one story-pair.

3. The method of claim 2, wherein determining inter-story similarity vectors further comprise the step of normalizing the inter-story similarity metric based on the source-pair statistics.

4. The method of claim 2, wherein determining inter-story similarity vectors further comprise the step of incrementally normalizing the inter-story similarity metric based on the source-pair statistics.

5. The method of claim 2, wherein the inter-story similarity metric is normalized based on at least one of subtraction and division.

6. The method of claim 2, wherein the inter-story similarity metric is at least one of a probability based similarity metric and a Euclidean based similarity metric.

7. The method of claim 6, wherein the probability based inter-story similarity metric is at least one of a Hellinger, a Tanimoto and a clarity distance based metric.

8. The method of claim 6, wherein the Euclidean based inter-story similarity metric is a cosine-distance based metric.

9. The method of claim 2, wherein the inter-story similarity metrics are based on terms in at least one source-identified term frequency-inverse story frequency models.

10. The method of claim 9, wherein the terms in source-identified term frequency-inverse story frequency models are based on language.

11. The method of claim 9, wherein determining terms comprises the steps:
    determining a reference language; and
    determining reference language and non-reference language terms.

12. The method of claim 2, wherein the at least one inter-story similarity metric is normalized based on at least one of a source-pair identified similarity statistic.

13. The method of claim 2, wherein at least one of the source-pair similarity statistics are determined based on a source hierarchy.

14. The method of claim 13 wherein the source hierarchy is determined based on at least one source characteristic.

15. The method of claim 13 wherein the source characteristic is at least one of a language characteristic, an input mode characteristic, a genre characteristic, a source name characteristic and a transformation characteristic.

16. The method of claim 13 wherein the source-pair similarity statistic for a new source is determined based on at least one source characteristic of the new source.

17. The method of claim 2, wherein determining at least one source-pair statistic for the at least one story-pair is based on at least one of a similarity metric and a statistic associated with the metric.

18. The method of claim 1, further comprising the step of transforming the source-identified training stories.

19. The method of claim 18, wherein transforming the source-identified training stories is at least one of translating, transcribing and linguistically transforming.

20. The method of claim 1, wherein the at least one predictive model is at least one of: a classifier, a support vector machine, a decision tree and a Naive-Bayes classifier.

21. A linked event detection training system comprising:
an input/output circuit;
a memory;
a processor that receives source-identified training stories and associated link label information for at least one story-pair via the input/output circuit, the link label information indicating the existence of at least one link between a pair of stories in the source-identified training stories and that the linked source-identified stories are related to the same event;
an inter-story similarity vector determining circuit that determines inter-story similarity vectors in the memory for at least one story-pair of the source-identified training stories; and
a predictive model determining circuit that determines and stores at least one predictive model in the memory based on the inter-story similarity vectors and the link label information.

22. The system of claim 21, wherein the inter-story similarity vector determining circuit is comprised of:
a similarity metric determining circuit that determines at least one inter-story similarity metric for the at least one story-pair; and
a similarity statistics determining circuit that determines at least one source-pair statistic for the at least one story-pair.

23. The system of claim 22, wherein the inter-story similarity vector determining circuit normalizes the inter-story similarity metric based on the source-pair statistics.

24. The system of claim 22, wherein the inter-story similarity vector determining circuit incrementally normalizes the inter-story similarity metric based on the source-pair statistics.

25. The system of claim 22, wherein at least one of the inter-story similarity metrics is normalized based on at least one of a subtraction and a division operation.

26. The system of claim 22, wherein at least one of the inter-story similarity metrics is at least one of a probability based similarity metric and a Euclidean based similarity metric.

27. The system of claim 26, wherein the probability based inter-story similarity metric is at least one of a Hellinger, a Tanimoto and a clarity distance based metric.

28. The system of claim 26, wherein the Euclidean based inter-story similarity metric is a cosine-distance based metric.

29. The system of claim 22 wherein the at least one inter-story similarity metric is normalized based on at least one of a source-pair identified similarity statistic.

30. The system of claim 22, wherein the source-pair identified similarity statistic is determined based on a source hierarchy.

31. The system of claim 30, wherein the source hierarchy is determined based on at least one of a source characteristic.

32. The system of claim 30, wherein the source characteristic is at least one of a language characteristic, an input mode characteristic, a genre characteristic, a source name characteristic and a transformation characteristic.

33. The system of claim 30, wherein the source-pair similarity statistic for a new source is determined based on at least one source characteristics of the new source.

34. The system of claim 22, wherein determining at least one source-pair statistic for the at least one story-pair is based on at least one of a similarity metric and a statistic associated with the metric.

35. The system of claim 21, wherein the source-identified training stories are transformed.

36. The system of claim 35, wherein transforming the source-identified training stories is at least one of translating, transcribing and linguistically transforming.

37. The system of claim 21, wherein the inter-story similarity metrics are based on terms in at least one source-identified term frequency-inverse story frequency model.

38. The system of claim 37, wherein the terms in the source-identified term frequency-inverse story frequency models are based on language.

39. The system of claim 37, wherein the processor determines terms based on a reference language; and determining reference language and non-reference language terms.

40. The system of claim 21, wherein the at least one predictive model is at least one of: a classifier, a support vector machine, a decision tree and a Naive-Bayes classifier.

41. A computer-implemented method of linked event detection comprising the steps of:
determining source-identified stories;
determining inter-story similarity vectors in a memory for the story-pairs of the source-identified stories;
determining at least one predictive model in the memory for link detection;
determining a link between the story-pairs based on the predictive model and the inter-story similarity vector; and
displaying the link on a computer or storing the link in an information repository, the link indicating the story-pairs are related to the same event.

42. The method of claim 41, wherein the step of determining inter-story similarity vectors comprises the steps of:
determining at least one inter-story similarity metric for each story-pair; and
determining source-pair statistics for the story-pairs.

43. The method of claim 42, wherein determining inter-story similarity vectors further comprise the step of normalizing the inter-story similarity metric based on the source-pair statistics.

44. The method of claim 42, wherein determining inter-story similarity vectors further comprise the step of incrementally normalizing the inter-story similarity metric based on the source-pair statistics.

45. The method of claim 42, wherein the inter-story similarity metric is normalized based on at least one of subtraction and division.

46. The method of claim 42, wherein the inter-story similarity metric is at least one of a probability based similarity metric and a Euclidean based similarity metric.

47. The method of claim 46, wherein the probability based inter-story similarity metric is at least one of a Hellinger, a Tanimoto and a clarity distance based metric.

48. The method of claim 46, wherein the Euclidean based similarity metric is a cosine-distance based metric.

49. The method of claim 42, wherein the inter-story similarity metrics are based on terms in at least one source-identified term frequency-inverse story frequency models.

50. The method of claim 49, wherein the terms in source-identified term frequency-inverse story frequency models are based on language.

51. The method of claim 49, wherein determining terms comprises the steps:
   determining a reference language; and
   determining reference language and non-reference language terms.

52. The method of claim 42, wherein the at least one inter-story similarity metric is normalized based on at least one of a source-pair identified similarity statistic.

53. The method of claim 42, wherein the source-pair identified similarity statistic is determined based on a source hierarchy.

54. The method of claim 53, wherein the source hierarchy is determined based on at least one of a source characteristic.

55. The method of claim 53, wherein the source characteristic is at least one of a language characteristic, an input mode characteristic, a genre characteristic, a source name characteristic and a transformation characteristic.

56. The method of claim 53, wherein the source-pair similarity statistic for a new source is determined based on at least one source characteristics of the new source.

57. The method of claim 41, further comprising the step of transforming the source-identified training stories.

58. The method of claim 57, wherein transforming the source-identified training stories is at least one of translating, transcribing and linguistically transforming.

59. The method of claim 41, wherein the at least one predictive model is at least one of: a classifier, a support vector machine and a decision tree, a Naive-Bayes-classifier.

60. The method of claim 41, wherein at least one of the predictive models is a trained predictive model.

61. A linked event detection system comprising:
   an input/output circuit;
   a memory;
   a processor that receives source-identified stories via the input/output circuit;
   an inter-story similarity vector determining circuit that determines inter-story similarity vectors in the memory for the story-pairs of the source-identified stories; and
   a link determining circuit that determines and displays on a computer or stores in an information repository, links between story-pairs based on a predictive model in the memory and the inter-story similarity vectors, the links indicating the story-pairs are related to the same event.

62. The system of claim 61, wherein the inter-story similarity vector determining circuit is comprised of:
   a similarity metric determining circuit that determines at least one inter-story similarity metric for the story-pairs; and
   a similarity statistics determining circuit that determines source-pair statistics for the story-pairs.

63. The system of claim 62, wherein the inter-story similarity vector determining circuit normalizes the inter-story similarity metric based on the source-pair statistics.

64. The system of claim 62, wherein the inter-story similarity vector determining circuit incrementally normalizes the inter-story similarity metric based on the source-pair statistics.

65. The system of claim 62, wherein at least one of the inter-story similarity metrics is normalized based on at least one of a subtraction and a division operation.

66. The system of claim 62, wherein at least one of the inter-story similarity metrics is at least one of a probability based similarity metric and a Euclidean based similarity metric.

67. The system of claim 66, wherein the probability based inter-story similarity metric is at least one of a Hellinger, a Tanimoto and a clarity distance based metric.

68. The system of claim 66, wherein the Euclidean based inter-story similarity metric is a cosine-distance based metric.

69. The system of claim 62, wherein the inter-story similarity metrics are based on terms in at least one source-identified term frequency-inverse story frequency model.

70. The system of claim 69, wherein the terms in the source-identified term frequency-inverse story frequency models are based on language.

71. The system of claim 69, wherein the processor determines terms based on a reference language; and non-reference language terms.

72. The system of claim 62, wherein the source-pair identified similarity statistic is determined based on a source hierarchy.

73. The system of claim 72, wherein the source hierarchy is determined based on at least one of a source characteristic.

74. The system of claim 72, wherein the source characteristic is at least one of a language characteristic, an input mode characteristic, a genre characteristic, a source name characteristic and a transformation characteristic.

75. The system of claim 72, wherein the source-pair similarity statistic for a new source is determined based on at least one source characteristics of the new source.

76. The system of claim 61, wherein the source-identified training stories are transformed.

77. The system of claim 76, wherein transforming the source-identified training stories is at least one of translating, transcribing and linguistically transforming.

78. The system of claim 62, wherein the at least one inter-story similarity metric is normalized based on at least one of a source-pair identified similarity statistic.

79. The system of claim 61, wherein the predictive model is at least one of: a classifier, a support vector machine and a decision tree, a Naive-Bayes classifier.

80. The system of claim 61, wherein at least one of the predictive models is a trained predictive model.

81. A computer-implemented method of determining a stopword list comprising the steps of:
   determining a source-identified training corpus of text information;
   determining a verified first source-mode transformation of the source-identified training corpus text from a first mode to a second mode based on at least one of a verified transcription and a verified translation;
   determining an un-verified second source-mode transformation of the source-identified training corpus text from a first mode to a second mode;
   determining at least one transformation error associated with distribution differences between the first and second transformations and identified sources;
   determining and storing at least one source-specific transformation action for the determined transformation errors in a memory; and identifying and transforming transformation errors in other transformed source-identified texts based on the source-specific transformation actions in the memory.

82. The method of claim 81, wherein the first mode is at least one of a text source, an optical character recognition source and an automatic speech recognition source.

83. The method of claim 81, wherein the second mode is at least one of a text source, an optical character recognition source and an automatic speech recognition source.

84. The method of claim 81, wherein the source-specific transformation is at least one of a removal, a repair and a normalization transformation.

85. Computer readable storage medium comprising: computer readable program code embodied on the computer readable storage medium, the computer readable program code processable to program a computer to determine at least one predictive model for a linked event detection system by executing steps comprising:
  determining source-identified training stories;
  determining inter-story similarity vectors in a memory for at least one story-pair;
  determining link label information for the at least one story-pair of the source-identified training stories, the link label information indicating training stories related to the same event; and
  determining and storing at least one predictive model in the memory based on the inter-story similarity vectors and the link label information.

86. Computer readable storage medium comprising: computer readable program code embodied on the computer readable storage medium, the computer readable program code processable to program a computer to determine at least one predictive model for a linked event detection system, the computer readable program code comprising:
  instructions to determine source-identified training stories;
  instructions to determine inter-story similarity vectors in a memory for at least one story-pair of the source-identified training stories;
  instructions to determine link label information for the at least one story-pair, the link label information indicating training stories related to the same event; and
  instructions to determine and store at least one predictive model in the memory based on the inter-story similarity vectors and the link label information.

87. Computer readable storage medium comprising: computer readable program code embodied on the computer readable storage medium, the computer readable program code processable to program a computer to detect linked events by executing steps comprising:
  determining source-identified stories;
  determining inter-story similarity vectors in a memory for the at least one story-pair of the source-identified stories;
  determining at least one predictive model in the memory for link detection; and
  determining a link between story-pairs based on the at least one predictive model and the inter-story similarity vectors, the link indicating the story-pairs are related to the same event; and
  displaying the link on a computer or storing the link in an information repository.

88. Computer readable storage medium comprising: computer readable program code embodied on the computer readable storage medium, the computer readable program code processable to program a computer to detect linked events, the computer readable program code comprising:
  instructions to determine source-identified stories;
  instructions to determine inter-story similarity vectors in a memory for the at least one story-pair of the source-identified stories;
  instructions to determine at least one predictive model in the memory for link detection;
  instructions to determine a link between story-pairs based on the predictive model and the inter-story similarity vectors, the link indicating the story-pairs are related to the same event; and
  instructions to display the link on a computer or store the link in an information repository.

* * * * *